United States Patent [19]

Preston et al.

[11] Patent Number: 5,435,201

[45] Date of Patent: Jul. 25, 1995

[54] TRANSMISSION SHIFT MECHANISM WITH BALL RAMP ACTUATED GEAR CLUTCH PACKS

[75] Inventors: David M. Preston, Clarkston; Gregory J. Organek, Dearborn, both of Mich.

[73] Assignee: Eaton Corporation, Cleveland, Ohio

[21] Appl. No.: 214,937

[22] Filed: Mar. 17, 1994

[51] Int. Cl.[6] .............................................. F16D 13/00
[52] U.S. Cl. ................................... 74/337.5; 192/84 C
[58] Field of Search .............. 192/35, 84 C; 74/337.5, 74/339

[56] References Cited

U.S. PATENT DOCUMENTS

| | | | |
|---|---|---|---|
| 2,738,045 | 3/1956 | Mergen et al. | 192/84 C |
| 2,937,729 | 5/1960 | Sperr, Jr. | 192/84 C |
| 2,966,975 | 1/1961 | Wiedman et al. | 192/84 C |
| 5,078,249 | 1/1992 | Botterill | 192/93 |

FOREIGN PATENT DOCUMENTS 58-146723  9/1983  Japan .
1582237  1/1981  United Kingdom .

*Primary Examiner*—Dirk Wright
*Attorney, Agent, or Firm*—Loren H. Uthoff, Jr.; Howard D. Gordon

[57] ABSTRACT

A gearbox having at least two parallel rotating shafts and at least two pairs of gears each pair comprising a gear on one of the shafts permanently in mesh with a freely rotating gear on the other shaft, the rotating gear on one of the shafts being connectable to the shaft by friction gear clutch packs loadable by a ball ramp mechanism having a control ring rotatably supported on a shaft and a pressure ring nonrotatably supported on the same shaft where a coil is used to electromagnetically connect the control ring to the rotating gear which causes the ball ramp mechanism to axially expand onto the gear clutch pack. The ball ramp mechanism is actuated when there is relative rotation between the control ring and the pressure ring as rolling members travel in opposed variable depth grooves formed in the opposed faces of the control ring and the pressure ring.

25 Claims, 3 Drawing Sheets

TRANSMISSION SHIFT MECHANISM WITH BALL RAMP ACTUATED GEAR CLUTCH PACKS

BACKGROUND OF THE INVENTION

1. Field of the Invention

The present invention relates to a gearbox comprising at least two parallel shafts carrying gears permanently meshing with one another in pairs, one gear of each pair being connectable to its associated shaft for torque transmission by a friction gear clutch pack which is axially loaded by a ball ramp actuator.

2. Description of the Prior Art

It is known to automate a traditional manual gearbox (transmission) by electronically controlling a plurality of actuators to move the transmission gearshift mechanism in coordination with a fully or partially automated driveline clutch. The actuators move the transmission shifting rails holding the shift forks which in turn control the axial movement of one jaw clutch at the end of each shift fork. The jaw clutch axially slides along a splined transmission mainshaft to engage gearing which nonrotatably couples the input to the output of the transmission. Similar mechanical transmissions are well known in the prior art and may be appreciated by reference to U.S. Pat. Nos. 3,105,395; 3,283,613; 4,754,665, 4,876,924 and 5,053,961, the disclosures of which are hereby incorporated by reference.

It is also known to use ball ramp actuators powered by a separate drive motor for each pair of ball ramp actuators in a transmission to load clutch packs on the mainshaft to frictionally transfer rotary motion from the mainshaft to gears riding on the mainshaft which are in mesh with gears on a parallel countershaft. U.S. Pat. No. 5,078,249, the disclosure of which is hereby incorporated by reference, describes such a gearbox. The ball ramp units consist of two pressure rings and an adjusting ring disposed therebetween. Both the pressure and adjusting rings have variable depth grooves with a rolling member disposed therein for axially expanding and contracting the pressure ring dependent on the direction that the adjusting ring is rotated relative to the pressure rings. The rotary motion of the adjusting ring is supplied by an actuator (motor) that is reacted against the transmission case. To allow the friction clutch pack to rotate with the transmission gear wheel, the pressure ring axially loads the clutch pack through a roller bearing. Thus, the ball ramp assembly does not rotate relative to case ground but only moves through a limited angle as required to cause the rolling member to traverse the variable depth grooves in the pressure ring and the adjusting ring.

The use of an electrical motor type actuator to rotate the adjusting ring relative to the transmission case results in complication and expense associated with the mechanical components. The gearing required to transfer the relatively high speed rotary motion of a motor to the low travel rotary motion of the adjusting gear creates much of this complication. Also, the required roller bearings are expensive.

Another disadvantage with the use of the electric motors to supply the power to the ball ramp actuators is that due to the limited output torque of the motors for a given package size, a gear reduction system must be used to transfer the rotation of the motor to the adjusting ring. This gear reduction slows the speed of response of the ball ramp actuator thereby slowing the speed that a transmission shift can be executed.

SUMMARY OF THE INVENTION

In accordance with the present invention, the drawbacks of the prior art are overcome or minimized through the use of the power in the rotary mainshaft and countershaft to energize a ball ramp clutch which axially loads a clutch pack so as to frictionally couple a drive gear to a rotating transmission main shaft. In this manner simple electromagnetic coils can be used to control the engagement of the ball ramp actuator without the complication of a motor or other rotary actuator which has to use a gear driven adjusting ring with its attendant slow response and mechanical complication.

The above is accomplished by electromagnetically coupling the ball ramp control ring to a transmission mainshaft gear using an electrical coil for introducing a magnetic field in a control (adjusting) ring and a drive ring which is slidingly nonrotatably connected to the mainshaft gear. Thus, the magnetic connects the drive ring, which is nonrotatably connected to the mainshaft, to the control ring. The control ring comprises one side of the ball ramp mechanism where the other side is comprised of a pressure ring which is axially moved by operation of rolling elements in variable depth ramps formed in the control and pressure rings. The ball ramp mechanism loads a gear clutch pack which frictionally joins the mainshaft to the mainshaft gear which in turn engages two mating countershaft gears which rotate with the countershaft in a twin countershaft type transmission.

Although the present invention is described in relation to use in a twin countershaft type transmission, any type of gearbox could make use of the present invention to frictionally couple a gear to a rotating shaft.

The control ring has a plurality of circumferential grooves formed in the surface that faces the pressure ring. Likewise, the pressure ring has a like number of opposed circumferential variable depth grooves formed in the surface that faces the control ring. A rolling element is disposed in each pair of opposed grooves which serve to establish the axial separation distance between the adjusting ring and the pressure ring. The grooves are formed so that energization of the electrical coil causes relative rotation between the control ring and the pressure ring which causes the rolling elements to axially separate the control ring from the pressure ring by rolling along the variable depth grooves. The pressure ring axially moves away from the control ring and thereby induces a load in the gear clutch pack.

One provision of the present invention is to provide control of a ball ramp actuator connected to a gear clutch pack in a transmission shifting system using an electrical coil.

Another provision of the present invention is to provide control of a ball ramp actuator to load a gear clutch pack using an electrical coil to induce an electromagnetic field in a drive ring which is nonrotatably connected to a drive gear.

Another provision of the present invention is to provide a compact ball ramp actuation system to control the load on a transmission gear clutch pack.

Still another provision of the present invention is to provide a compact, fast acting ball ramp actuation system to control the axial load on a gear clutch pack in response to an electrical signal supplied to an electrical coil.

DETAILED DESCRIPTION OF THE PREFERRED EMBODIMENT

Figure 1:
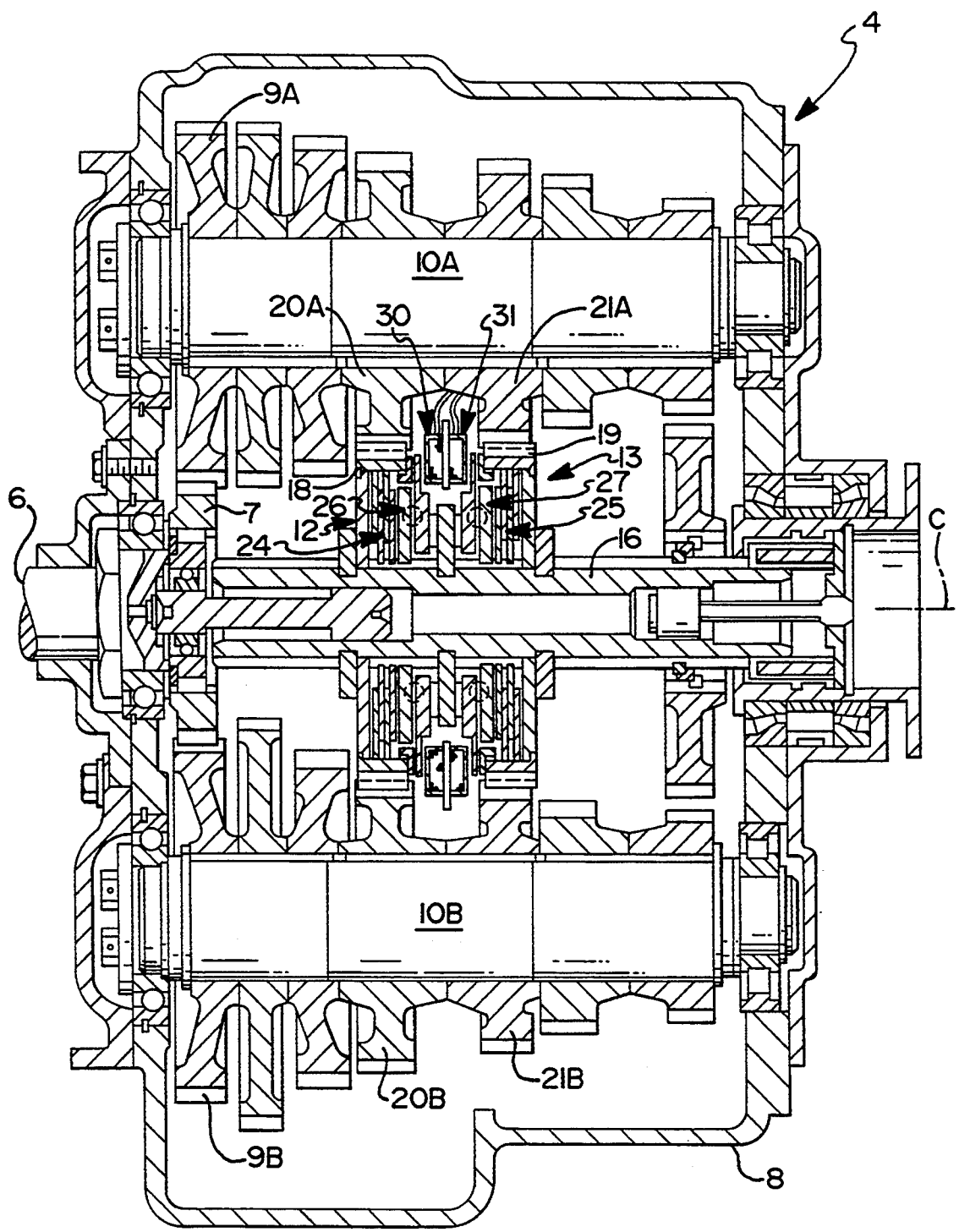
FIG. 1 is a partial cross-sectional view of a transmission according to the present invention.

Certain terminology will be used in the following description for convenience in reference only and will not be limiting. For example, the terms "forward" and "rearward" will refer to directions forward and rearward of the transmission as normally mounted in a vehicle. The terms "rightward" and "leftward" will refer to directions in the drawings in connection with which the terminology is used. The terms "inwardly" and "outwardly" will refer to directions toward and away from, respectively, the geometric center of the apparatus. The terms "upward" and "downward" will refer to directions as taken in the drawings in connection with which the terminology is used. All foregoing terms mentioned above include the normal derivatives and equivalents thereof.

A typical change gear transmission 4 with which the improved ball ramp actuated gear clutch packs 12 and 13 of the present invention may be advantageously utilized may be seen by reference to FIG. 1. Transmission 4 is a simple transmission of the twin countershaft type which is well known in the art and which may be understood in greater detail by reference to U.S. Pat. Nos. 3,105,395, 4, 152,949 and 5,269,194 the disclosures of which are hereby incorporated by reference.

The illustrated transmission 4 comprises an input shaft 6 carrying a drive gear 7 which engages countershaft drive gears 9A and 9B for rotation therewith. Input shaft 6 is intended to be driven by a prime mover such as an engine (not shown) by means of a master clutch or torque converter (not shown) the use of which is well known in the art. A pair of substantially identical countershafts 10A and 10B are rotatably mounted in a housing 8 and rotate with the input shaft 6 through rotation of the countershaft drive gears 9A and 9B. An output shaft or mainshaft 16 is provided which is preferably floatingly and/or pivotably mounted in the transmission housing 8 and is driven by the countershafts 10A and 10B which split the Icad. Thus, the mainshaft 16 is not directly connected to the input shaft 6 but is driven by the countershafts 10A and 10B through a selected gear ratio. Each of the countershafts 10A and 10B carry a plurality of countershaft gears, including, for example, countershaft gears 20A and 21A on countershaft 10A and countershaft gears 20B and 21B on countershaft 10B, all of which are fixed thereto for rotation therewith. Countershaft gears 20A and 20B are constantly meshed with mainshaft drive gear 18 and countershaft gears 21A and 21B are constantly meshed with mainshaft gear 19. Any number of gear pairs could be used to provide the desired number of drive gear ratios and a similar theory of operation could be utilized to transfer power to the mainshaft 16 from the countershafts 10A and 10B.

The mainshaft gears 18 and 19 for example, are not rotationally fixed to the mainshaft 16 and do not normally drive the mainshaft 16 unless rotationally coupled to the mainshaft 16 with some type of device such as the ball ramp actuators 12 and 13 of the present invention. Prior art methods include the use of jaw clutches which are moved using operator controlled shift forks through a lever controlled shift linkage. Although not shown in FIG. 1, other pairs of countershaft gears and their respective mainshaft gears are in constant mesh. The mainshaft gears 18 and 19 are rotatably supported and axially fixed on the mainshaft 16. According to the present invention, the mainshaft gears 18 and 19 are frictionally coupled to the mainshaft 16 using friction gear clutch packs 24 and 25 respectively. The gear clutch packs 24 and 25 are loaded using ball ramp mechanisms 26 and 27 whose axial positions are controlled using electromagnets 30 and 31 respectively. Typically, only one electromagnet is energized at a time since only one gearset should be engaged. For example, when the speed ratio determined by gearset countershaft gears 20A, 20B and mainshaft gear 18 is desired, electromagnet 30 is energized. The electromagnet 30 introduces a torque which activates ball ramp mechanism 26 which due to axial expansion applies an axial load to the gear clutch pack 24. Clutch pack 24 then frictionally rotationally couples mainshaft gear 18 to the mainshaft 16. In a similar manner, the electromagnet 31 could be energized to frictionally connect mainshaft gear 19 to the mainshaft 16 using the ball ramp actuator 13 to select the gear ratio determined by the countershaft gears 21A and 21B.

The power flow rearward through the transmission 4 flows through the input shaft 6 through the drive gear 7 which meshes outwardly with the countershaft drive gears 9A and 9B. The countershafts 10A and 10B rotate the countershaft gears 20A and 20B respectively which combine to inwardly drive the mainshaft through the mainshaft gear 18. Preferably, as is well known in the art, mainshaft gears 20 and 22 are somewhat radially moveable (floating) relative to the mainshaft 16. The advantages of utilizing a floating mainshaft and/or floating mainshaft gears is well known in the art and may be appreciated in greater detail by reference to the aforementioned U.S. Pat. No. 3,105,395.

Figure 2:
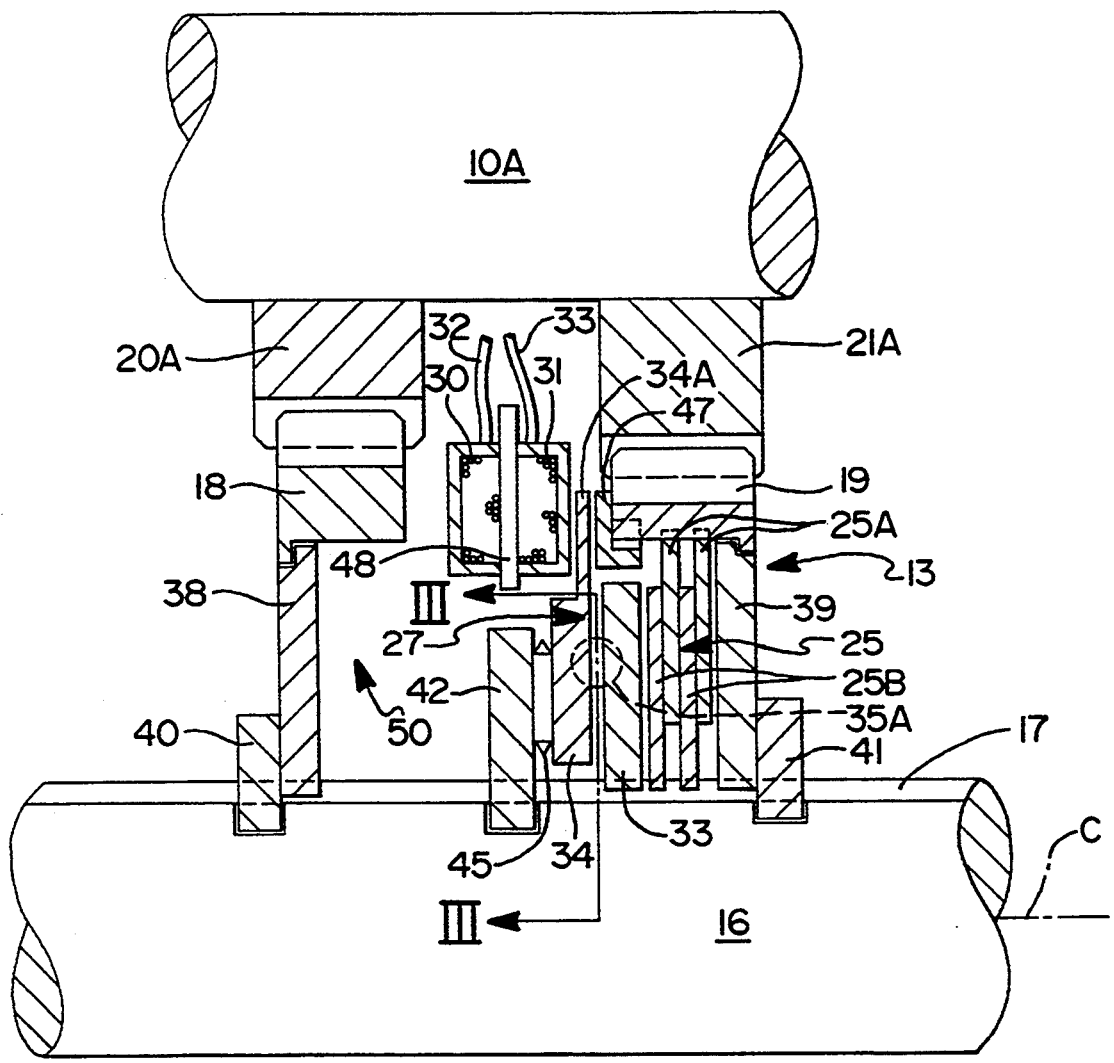
FIG. 2 is a cross-sectional view of the ball ramp actuator of the present invention installed on one mainshaft gear in a transmission.

Now referring to FIG. 2, a partial cross section of ball ramp actuator 13 as shown in FIG. 1 is shown. The control ring 34 reacts against the thrust plate 42, which is fixed to the mainshaft 16 in a snap ring type groove, so as to axially move the pressure ring against the gear clutch pack 25 when the ball ramp mechanism 27 is energized. The mainshaft gear 19 is held in axial position with a retention plate 41 which also is fixed to the mainshaft 16 in a snap ring groove. The mainshaft 16 has a plurality of axially extending splines 17 formed in its outer surface.

The ball ramp mechanism 27 is energized by electrically energizing the coil 31 to produce an electromagnetic field that travels through the control ring extension 34A and the drive plate 47. The control ring 34 is rotated relative to the pressure ring 33 by application of a torque input created by the drive plate 47 which is keyed to rotate with the mainshaft gear 19 but is allowed to axially slide to engage the control ring 34. If there is relative rotation between the control ring 34 and the mainshaft gear 19, the drive plate 47 applies a force to the control ring 34 that causes the control ring 34 to rotate relative to the pressure ring 33 which energizes the ball ramp mechanism 27 the operation of which will be discussed in more detail subsequently. The axial movement of the pressure ring 33 reacting against the thrust bearing 45 and thrust plate 42 in one direction and the side plate 39 in the other direction to load the gear clutch pack 25 thereby frictionally coupling the mainshaft gear 19 to the mainshaft 16. The side plates 38 and 39 can be separate discs or formed as part of the mainshaft gears 18 and 19 respectively.

A portion of the plates in the gear clutch pack 25 identified as drive plates 25A nonrotationally engage the countershaft gear 19 through splines formed in the inside diameter of the mainshaft gear 19. The drive plates 25A are frictionally coupled to adjacent plates in the clutch pack 25 identified as driven plates 25B which nonrotationally engage splines 17 formed on the outside diameter of the mainshaft 16 and serve to drive the mainshaft 16. Any number of alternating drive plates 25A and driven plates 25B can be used depending on the packaging space and the torque transfer requirements. A thrust bearing 45 is disposed between the control ring 34 and the thrust plate 42 which transfers the force generated by the ball ramp mechanism 27 to react against the thrust plate 42 and load the drive plates 25A against the driven plates 25B thereby providing a frictional coupling of the mainshaft gear 19 to the countershaft gears 21A and 21B. Any number of ball ramp actuators could be used according to the number of meshing gear pairs.

For example, similar to the ball ramp actuator 13, a second adjacent ball ramp actuator 12 as shown in FIG. 1 can be fitted to the space labeled as space 50 in FIG. 2. Ball ramp 12 would be energized with the coil 30 and would frictionally connect the mainshaft gear 18 with the countershaft gears 20A and 20B. Note that only one gear clutch pack 24 or 25 can be fully engaged at any given time.

The components that make up the ball ramp actuators 12 and 13 are generally annular in shape and encircle the mainshaft 16 being geometrically centered with the mainshaft axis of rotation C. The coils 30 and 31 are mounted to the transmission case 56 with the coil support 48 which is annular in shape and extends to meet the transmission case 56 in some conventional manner. The coils 30 and 31 are electrically connected to a transmission shift control circuit (not shown) which supplies electrical power to one coil at a time depending on the gear ratio desired.

Figure 3:
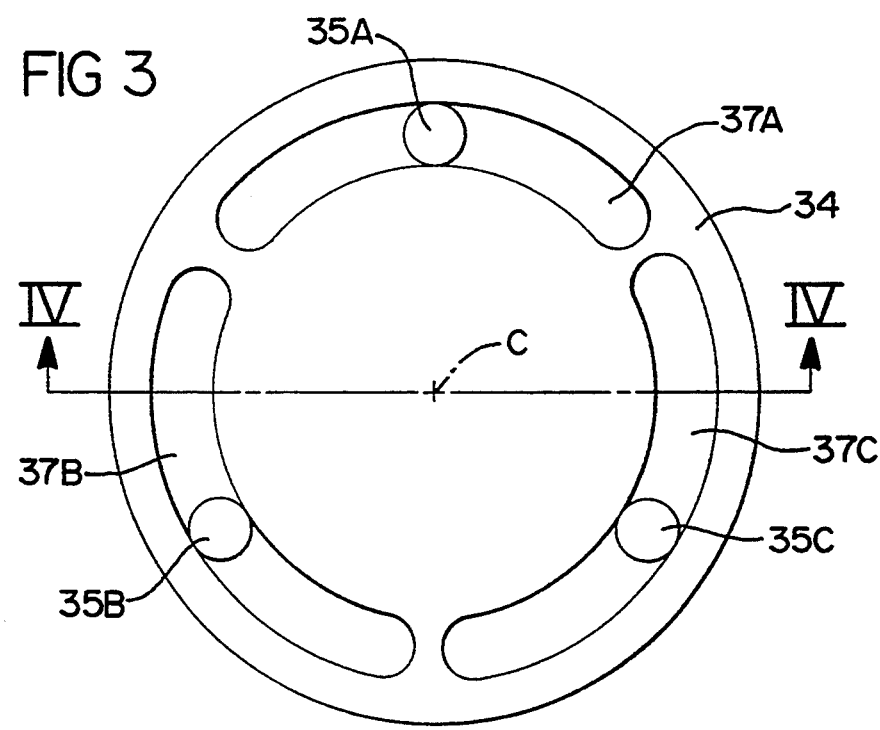
FIG. 3 is an axial cross-sectional view of the ball ramp mechanism of the present invention taken along line III—111 of FIG. 2.
Figure 4:
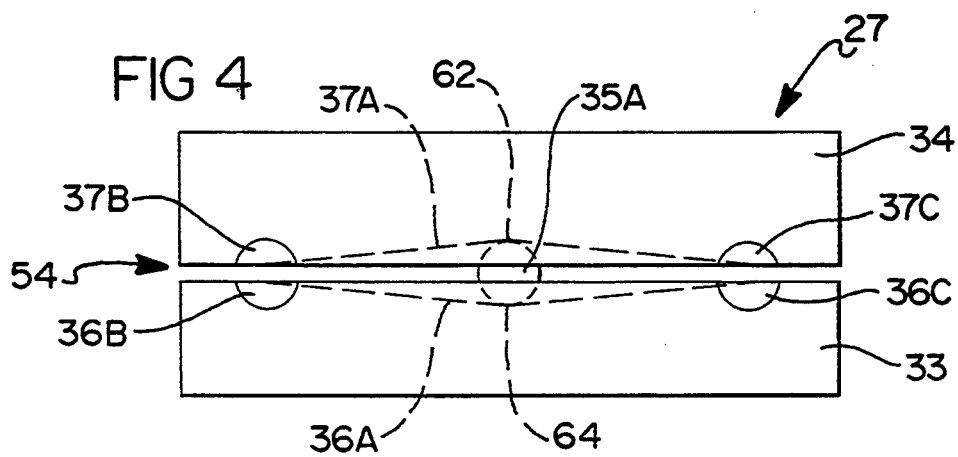
FIG. 4 is a cross-sectional view of the ball ramp mechanism of the present invention taken along line IV—IV of FIG. 3 at minimum separation.
Figure 5:
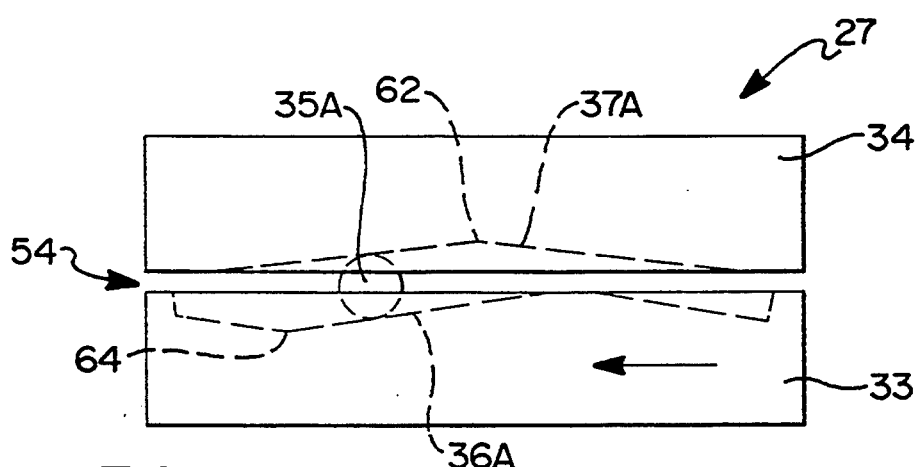
FIG. 5 is a cross-sectional view of the ball ramp mechanism of the present invention taken along line IV—IV of FIG. 3 with increased separation.

Referring now to FIGS. 3, 4 and 5 to describe the operation of the ball ramp mechanism 27 portion of the ball ramp actuator 13, a crosssectional view of the control ring 34 taken along line III—III is shown in FIG. 3 and views taken along line IV-IV of the control ring 34 and the pressure ring 33 separated by a spherical element 35A are shown in FIGS. 4 and 5. Three spherical rolling elements 35A, 35B and 35C are spaced approximately 120° apart rolling in three tapered ramps 37A, 37B and 37C respectively as the control ring 34 is rotated relative to the pressure ring 33. Any number of spherical rolling elements 35A and respective ramps 37A could be utilized depending on the desired rotation and axial motion of the ball ramp actuator 13. It is desirable to employ at least three spherical rolling elements 35A, 35B, 35C travelling on a like number of identical equally spaced opposed tapered ramps 37A and 36A, 37B and 36B, and 37C and 36C formed in both the control ring 34 and the activation ring 33 to provide stability to the control ring 34 and the activation ring 33. Any type of low friction device which would roll along the tapered ramps 37A, 37B, and 37C could be utilized for the rolling elements 35A, 35B and 35C such as a ball or a roller.

Three semi-circular, circumferential tapered ramps 37A, 37B and 37C are shown formed in the face of the control ring 34 with corresponding identical opposed tapered ramps 36A, 36B and 36C (where 36B and 36C are not fully shown) formed in the face of the pressure ring 33 as shown in FIG. 4. The tapered ramps 37A, 37B, 37C, 36A, 36B and 36C vary in axial depth according to the circumferential position in the ramp and circumferentially extend for approximately 120 degrees (actually less than 120° to allow for a separation section between the ramps). Any number of opposed ramps and associated rolling members could be utilized depending on the desired range of rotation and needed axial travel of the ball ramp mechanism 27. The ramp depth is at a maximum at the center of its length. The control ring 34 and the pressure ring 31 are made of a high strength steel with the tapered ramps 35A, 35B, 35C, 36A, 36B, and 36C carburized and hardened to $R_c$ 55–60. The axial separation 44 shown in FIG. 4 between the control ring 34 and the pressure ring 33 is determined by the rotational orientation between the two corresponding opposed ramps such as 35A and 36B where the spherical rolling element 35A rolls on each ramp 35A and 36B as the control ring 34 is rotated relative to the pressure ring 33 on the same axis of rotation C. The relative rotation forces the control ring 34 and the pressure ring 33 apart or allows them to come closer together as determined by the position of the rolling elements 35A, 35B and 35C or their respective ramp pairs 37A, 36A and 37B,36B and 37C, 36C thereby providing an axial movement for clamping the gear clutch pack 25 between the pressure ring 33 and the side plate 39.

FIG. 4 illustrates the rotational orientation of the control ring 34 and the pressure ring 33 when the axial separation distance 44 is at a minimum since the ramps 37A and 36A are aligned and the spherical element 35A is in the deepest section of the ramps 37A and 36A.

The control ring 34 is rotated relative to the pressure ring 33 by application of a torque input created by the electromagnetic force generated by electrically energizing the coil 31 which connects the control ring 34 to a drive plate 47. The drive plate 47 is keyed to rotate with the mainshaft gear 19 but is allowed to axially slide to engage the control ring 34. If their is relative rotational motion between the control ring 34 and the mainshaft gear 19, the drive plate 47 applies a force to the control ring 34 that causes the control ring 34 to rotate relative to the pressure ring 33 which in turn causes the ramps 37A, 37B and 37C in the control ring 34 to move relative to opposed ramps 36A, 36B and 36C in the pressure ring 33. This relative rotational motion results in an increase in the axial separation 54 (see FIG. 5) between the control ring 34 and the pressure ring 33 as the rolling elements 35A, 35B and 35C assume new positions in their respective ramps 37A, 37B and 37C. The increased axial separation 54 loads the gear clutch pack 25 which frictionally couples the mainshaft gear 19 to the countershaft gears 21A and 21B which supply rotational power to the mainshaft 16. The mainshaft 16 is mated to the vehicle driveshaft (not shown) for transfer to the balance of the driveline. The relative rotation of the control ring 34 is clearly illustrated in FIGS. 4 and 5 by the relative shift in position of reference points 62 and 64 from directly opposed in FIG. 4 to an offset position in FIG. 5 caused by rotation of the control ring 34 in the direction of the arrow. Note that the ramps 37B, 37C, 36B and 36C are not shown in FIG. 5.

The control ring 34 reacts against the thrust plate 42, which is fixed to the mainshaft 16 in a snap ring type groove, so as to axially move the pressure ring against the gear clutch pack 25. The mainshaft gear 19 is held in axial position with a retention plate 41 which also is fixed to the mainshaft 16 in a snap ring type groove. This axial displacement can be used for a variety of applications since the axial force generated by the pressure ring 33 relative to the torque applied to the control ring 34 is quite high, typically a ratio of 100:1. Additional illustrative details of operation of a ball ramp actuator can be found by reference to U.S. Pat. No. 4,805,486, the disclosure of which is hereby incorporated by reference.

Although the present invention has been described in terms of what it will be apparent to those skilled in the art that various changes may be made without departing from the spirit and the scope of the invention as hereinafter claimed. It is therefore intended that the claims cover all such changes.

We claim:

1. A transmission comprising at least two shafts disposed in a housing with their axes parallel to one another; at least two pairs of gears, each pair comprising a gear on one of said shafts permanently in mesh with a gear on said other shaft; said gears on one of said shafts being connectable to said shaft for torque transmissions by respective friction clutches; and an actuating means disposed adjacent to each of said friction clutches for selectively causing engagement thereof, said actuating means comprising:
    a pressure ring operable axially on each of said friction clutches, said pressure ring being nonrotatable and movable axially relative to an associate shaft;
    a control ring disposed adjacent to said pressure ring, said control ring being rotatable and axially fixed relative to said associated shaft;
    a drive ring keyed to and rotating with said gear riding on said associated shaft, said drive ring disposed adjacent to said control ring;
    an annular coil mounted to said housing encircling said associated shaft, said coil creating an electromagnetic field to couple said control ring to said drive ring thereby causing relative angular movement between said control ring and said pressure ring;
    each side of said control ring and said adjacent pressure ring having opposed faces provided with circumferentially extending grooves, arranged as at least three opposed pairs of grooves, including portions of varying depth; and
    rolling members disposed one in each opposed pair of grooves;
    said grooves on one side of said control ring and said adjacent pressure ring being arranged so that relative angular movement of said control ring and said pressure ring in either direction from a starting position thereof, causes axial movement of the pressure ring away from the control ring to operate on said adjacent friction clutch.

2. The transmission of claim 1, wherein said gear friction clutch is comprised of a plurality of drive friction plates, said drive friction plates nonrotatably coupled to said rotating gear and a plurality of driven friction plates nonrotatably coupled to said associated shaft.

3. The transmission of claim 1, wherein said control ring reacts against a thrust bearing axially supported by a thrust plate, said thrust plate axially fixed to said associated shaft.

4. The transmission of claim 1, wherein said associated shaft is a mainshaft.

5. The transmission of claim 4, wherein said associated shaft is driven by two of said parallel shafts, both of said parallel shafts driven by an input shaft.

6. The transmission of claim 1, wherein said rotating gear has side plate forming an annular cavity is shaped in the form of a ring encircling said associated shaft, said rotating gear having an inside diameter disc shaped side plate covering one side of open space extending between said inside diameter of said rotating gear and said associated shaft thereby forming a cavity where said gear clutch pack is disposed within said cavity.

7. The transmission of claim 6, wherein said rotating gear has a plurality of axially extending gear splines formed in said inside diameter, said drive friction plates engaging said gear splines.

8. The transmission of claim 7, wherein said drive friction plates are alternated in axial position with said driven friction plates.

9. The transmission of claim 6, wherein said side plate is axially retained on said associated shaft with a retention plate which extends into a circumferential groove formed in said associated shaft.

10. The transmission of claim 1, wherein said associated shaft has a plurality of axially extending shaft splines formed on an outer surface thereof, said driven friction plates engaging said shaft splines.

11. The transmission of claim 1, wherein said control ring axially reacts against a thrust bearing disposed between said control ring and a thrust plate, where said thrust plate is axially retained on said associated shaft.

12. The transmission of claim 11, wherein said thrust plate is axially retained on said associated shaft using a circumferentially extending groove to hold said thrust plate.

13. A gearbox comprising:
    a housing;
    an input shaft supported in said housing;
    at least one countershaft having an axis of rotation, said countershaft rotatably supported in said housing and geared to said input shaft for rotation therewith;
    a mainshaft having an axis of rotation parallel to said axis of rotation of said countershaft;
    at least one drive gear nonrotatably fixed to said countershaft;
    at least one driven gear rotatably supported on said mainshaft, said driven gear and said drive gear permanently meshed one to the other;
    a gear friction pack encircling said mainshaft and adjacent to said mainshaft gear comprised of a plurality of drive friction plates nonrotatably connected to said driven gear and a plurality of driven friction plates nonrotatably connected to said mainshaft;
    a coil electrically energized to create an electromagnetic field;

a ball ramp mechanism comprising a pressure ring nonrotatably connected to said mainshaft and a control ring both encircling said mainshaft and having opposed faces provided with circumferentially extending grooves, arranged as at least three opposed pairs of grooves, including portions of varying depth, and rolling members disposed one in each opposed pair of grooves, said grooves on said pressure ring and said adjacent control ring being arranged so that relative angular movement of said pressure ring and said control ring in either direction, from a starting position thereof, causes axial movement of said pressure ring away from said control ring to axially load said gear clutch pack thereby frictionally coupling said mainshaft gear to said mainshaft;

a thrust plate axially fixed to said mainshaft;

a thrust bearing interposed between said control plate and said thrust plate for transferring loads from said ball ramp mechanism to said thrust plate while permitting relative rotation therebetween;

a coil mounted to said housing and electrically energized to create an electromagnetic field to couple said control ring to said mainshaft gear such that relative rotation of said mainshaft gear and said mainshaft causes said control ring to rotate relative to said pressure ring.

14. The gearbox of claim 13, wherein a drive ring is nonrotatably connected to said mainshaft gear and is interposed between said control ring and said mainshaft gear for transmitting rotational motion therebetween.

15. The gearbox of claim 14, wherein said coil and a portion of said control ring and said drive ring are in substantial axial alignment.

16. The gearbox of claim 13, wherein said driven friction plates are alternated in position with said drive friction plates.

17. The gearbox of claim 16, wherein a plurality of gear splines are formed on said inside diameter of said driven gear, said drive friction plates nonrotatably engaging said gear splines.

18. The gearbox of claim 16, wherein said side plate is made as one piece with said driven gear.

19. The gearbox of claim 16, wherein said driven gear rotates relative to said mainshaft on the peripheral edge of said side plate, and wherein said side plate is nonrotatably attached to said mainshaft.

20. The gearbox of claim 13, wherein said mainshaft has a plurality of axially extending mainshaft splines formed on an outer surface, said pressure ring and said drive friction plates and said side plate nonrotatably engaging said mainshaft splines.

21. The gearbox of claim 13, wherein said driven gear is ring shaped having a side plate extending from an inside diameter of said driven gear to said mainshaft for rotational support of said driven gear about said axis of rotation of said mainshaft.

22. A gearbox comprising:
a mainshaft having a plurality of mainshaft gears freely rotating thereon;
a countershaft driving a plurality of countershaft gears nonrotatably attached thereto;
an annular gear clutch pack encircling said mainshaft disposed to frictionally engage said mainshaft gear thereby rotatably connecting said mainshaft gear to said mainshaft;
a ball ramp mechanism for activating said gear clutch packs, said ball ramp mechanism comprising a pressure ring nonrotatably connected to said mainshaft and a control ring both encircling said mainshaft and having opposed faces provided with circumferentially extending grooves, arranged as at least three opposed pairs of grooves, including portions of varying depth, and rolling members disposed one in each opposed pair of grooves, said grooves on said pressure ring and said adjacent control ring being arranged so that relative angular movement of said pressure ring and said control .ring in either direction, form a starting position thereof, causes axial movement of said pressure ring away from said control ring to axially load said gear clutch pack thereby frictionally coupling said mainshaft gear to said mainshaft;
a coil for creating an electromagnetic field to connect said control ring to said mainshaft gear;
a thrust plate axially fixed to said mainshaft for reacting against said ball ramp mechanism.

23. The gearbox of claim 22, further comprising a thrust bearing interposed between said thrust plate and said control ring allowing relative rotational motion therebetween.

24. The gearbox of claim 22, wherein said mainshaft gear is axially fixed in one direction by a retention plate, said retention plate being attached to said mainshaft, said ball ramp mechanism reacting against said thrust plate through said thrust bearing in one direction and said retention plate through said gear clutch pack in the other direction.

25. The gearbox of claim 22, further comprising a drive plate interposed between said mainshaft gear and said control ring, said drive plate nonrotatably engaging said mainshaft gear to transfer the rotational motion of said mainshaft gear to said control ring upon energizing said coil with electrical energy.

* * * * *